US009614562B2

(12) United States Patent
Demay et al.

(10) Patent No.: US 9,614,562 B2
(45) Date of Patent: Apr. 4, 2017

(54) COEXISTENCE SIGNALING FOR ADAPTIVE GAIN TABLE SELECTION

(71) Applicant: BROADCOM CORPORATION, Irvine, CA (US)

(72) Inventors: Jerome Demay, Irvine, CA (US); Thomas F. Baker, Monarch Beach, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/730,130

(22) Filed: Jun. 3, 2015

(65) Prior Publication Data

US 2016/0336984 A1 Nov. 17, 2016

Related U.S. Application Data

(60) Provisional application No. 62/160,511, filed on May 12, 2015.

(51) Int. Cl.
  *H04B 7/00* (2006.01)
  *H04B 1/12* (2006.01)
  *H04W 4/00* (2009.01)
  *H04W 52/18* (2009.01)
  *H04W 84/12* (2009.01)

(52) U.S. Cl.
  CPC ............ *H04B 1/123* (2013.01); *H04W 4/008* (2013.01); *H04W 52/18* (2013.01); *H04W 84/12* (2013.01)

(58) Field of Classification Search
  CPC ..................................... H04B 1/123

USPC ....................................... 455/234.1
See application file for complete search history.

(56) References Cited

U.S. PATENT DOCUMENTS 6,442,375 B1 * 8/2002 Parmentier ............. G01S 19/21
                                                342/357.59
7,724,846 B2 * 5/2010 Abraham ................ G01S 19/21
                                                375/144

* cited by examiner

*Primary Examiner* — Sanh Phu
(74) *Attorney, Agent, or Firm* — McDermott Will & Emery LLP

(57) ABSTRACT

A device implementing adaptive gain table selection based at least on coexistence signaling may include at least one processor circuit. The at least one processor circuit may be configured to identify that a packet is scheduled to be received by a receiver and retrieve at least one transmission indicator that indicates whether at least one transmitter is transmitting, where the at least one transmitter is collocated with the receiver within a device. The at least one processor circuit may be further configured to select a first gain table for reception of the packet by the receiver when the at least one transmission indicator indicates that the at least one transmitter is transmitting, otherwise selecting a second gain table for reception of the packet by the receiver. The at least one processor circuit may be further configured to apply gain to the receiver based at least on the selected gain table.

20 Claims, 5 Drawing Sheets

Enable detection of WLAN Tx cores

| Definition | Reset | RomReset | FwReset | Description |
|---|---|---|---|---|
| reserved | 0x0 | 0x0 | 0x0 | |
| wTx2GCore3Det_Enable | 0x0 | 0x0 | 0x0 | Enable 2G WLAN TX Core_3 detection |
| wTx2GCore2Det_Enable | 0x0 | 0x0 | 0x0 | Enable 2G WLAN TX Core_2 detection |
| wTx2GCore1Det_Enable | 0x0 | 0x0 | 0x0 | Enable 2G WLAN TX Core_1 detection |
| wTx2GCore0Det_Enable | 0x0 | 0x0 | 0x0 | Enable 2G WLAN TX Core_0 detection |

410

Power level threshold detection of WLAN Tx Core_0 and Core_1

| Bits | Access | Definition | Reset | RomReset | FwReset | Description |
|---|---|---|---|---|---|---|
| 15:8 | rw | wTx2GCore1PwrThres | 0x0 | 0x0 | 0x0 | 2G WLAN TX Core_1 power level threshold |
| 7:0 | rw | wTx2GCore0PwrThres | 0x0 | 0x0 | 0x0 | 2G WLAN TX Core_0 power level threshold |

420

Power level threshold detection of WLAN Tx Core_2 and Core_3

| Bits | Access | Definition | Reset | RomReset | FwReset | Description |
|---|---|---|---|---|---|---|
| 15:8 | rw | wTx2GCore3PwrThres | 0x0 | 0x0 | 0x0 | 2G WLAN TX Core_3 power level threshold |
| 7:0 | rw | wTx2GCore2PwrThres | 0x0 | 0x0 | 0x0 | 2G WLAN TX Core_2 power level threshold |

COEXISTENCE SIGNALING FOR ADAPTIVE GAIN TABLE SELECTION

CROSS-REFERENCE TO RELATED APPLICATIONS

The present application claims the benefit of U.S. Provisional Patent Application Ser. No. 62/160,511, entitled "Coexistence Signaling for Adaptive Gain Table Selection," filed on May 12, 2015, which is hereby incorporated by reference in its entirety for all purposes.

TECHNICAL FIELD

The present description relates generally to coexistence signaling, including coexistence signaling for adaptive gain table selection.

BACKGROUND

A wireless local area network (WLAN)/Bluetooth combination chip may include one or more WLAN cores and a Bluetooth modem that provide for WLAN and Bluetooth communications, respectively. Multiple WLAN cores may be used, for example, to facilitate multiple input multiple output (MIMO) communications. However, in some instances the WLAN and Bluetooth communications may interfere with one another. For example, a WLAN transmission signal can have a large bandwidth and therefore may be a high level jammer for the Bluetooth modem. Thus, when one or more of the WLAN cores is transmitting, the WLAN transmission signals can saturate the Bluetooth receiver and prevent the Bluetooth receiver from receiving a meaningful signal. In order to mitigate the interference, the Bluetooth receiver may implement an interference detection scheme, such as based on a Wideband Received Signal Strength Indication (WRSSI) or a saturation indication. However, the WRSSI and saturation indication may sample the signal during a short period of time and therefore may not always detect when one or more of the WLAN cores has started transmitting.

BRIEF DESCRIPTION OF THE DRAWINGS

Certain features of the subject technology are set forth in the appended claims. However, for purpose of explanation, several embodiments of the subject technology are set forth in the following figures.

FIG. 4 illustrates example tables listing bits utilized for coexistence signaling for adaptive gain table selection in accordance with one or more implementations.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for adaptive gain table selection, a Bluetooth modem selects a gain table for receiving a packet based not only on its own interference detection scheme, but also based on coexistence signals transmitted by one or more collocated WLAN cores that indicate when the WLAN cores are transmitting, and also indicate the power levels of any such transmissions. In particular, a real time indication of an active WLAN transmission, as well as the power level of the WLAN transmission, are provided by each of the individual WLAN cores to a Bluetooth modem, such as via a coexistence interface. The Bluetooth modem may then select a high-linearity gain table for its receiver when one or more of the WLAN cores are transmitting and/or when the power level of any such transmissions exceeds a particular power level threshold.

In one or more implementations, the Bluetooth modem may receive separate active transmission and power level signals from each of the WLAN cores. Since the front-end module/antenna isolation as well as internal integrated circuit (IC) isolation for the Bluetooth receiver may be different for each of the WLAN cores, the Bluetooth modem may utilize separate configurable power level thresholds for determining whether the high-linearity gain table should be used when each of the WLAN cores is transmitting.

Figure 1:
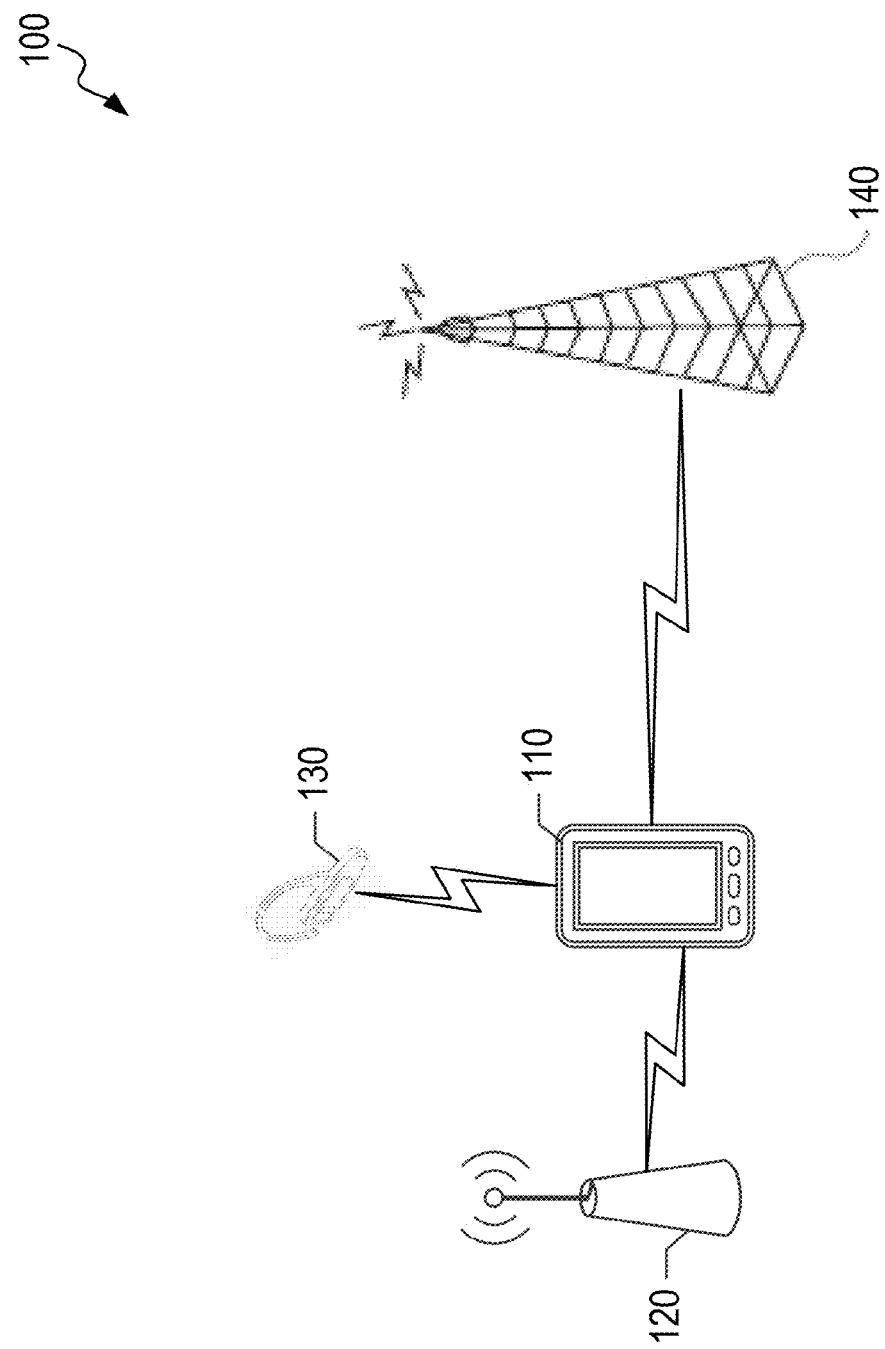
FIG. 1 illustrates an example network environment in which coexistence signaling for adaptive gain table selection may be implemented in accordance with one or more implementations.

FIG. 1 illustrates an example network environment 100 in which coexistence signaling for adaptive gain table selection may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a user device 110, an access point 120, an electronic device 130, and a base station 140. The user device 110 may include, may be a component of, and/or may be referred to in one or more implementations as, a User Equipment (UE). The user device 110 includes suitable logic, circuitry, interfaces, memory, and/or code that enables communications, e.g. with the access point 120, the electronic device 130, and/or the base station 140, via wireless interfaces and utilizing one or more radio transceivers. In one or more implementations, the user device 110 may be, or may include, a mobile phone, a personal digital assistant (PDA), a tablet device, a computer, or generally any device that is operable to communicate wirelessly with the access point 120, the electronic device 130, and/or the base station 140.

The electronic device 130 may be a device that communicates wirelessly with the user device 110, such as via Bluetooth, Zigbee, Bluetooth low energy, or any other wireless technology. For explanatory purposes, the electronic device 130 is depicted in FIG. 1 as a Bluetooth headset; however, the electronic device 130 is not limited to Bluetooth and/or a headset. The access point 120 may be a WLAN wireless access point that communicates with the user device 110 via WLAN (or Wi-Fi) communications. The base station 140 may include, may be a component of, and/or may be referred to in one or more implementations as, a Node B (NB) or an Evolved NodeB (eNodeB or eNB). The base station 140 may include suitable logic, circuitry, interfaces, memory, and/or code that enables wireless communications, e.g. with the user device 110, via wireless interfaces and utilizing one or more radio transceivers. The base station 140 may be a base station of a cellular-based wireless network, such as a Long-Term Evolution (LTE) communications network, or generally any cellular-based communications network. In one or more implementations, the user device 110, the access point 120, the electronic device 130 and/or the base station 140 may be, or may include all or part of, the system discussed below with respect to FIG. 5.

The user device 110 communicates with the access point 120 according to a first wireless technology specification or standard (e.g., a first type of wireless technology that uses a first frequency band and has a first channel bandwidth), the user device 110 may communicate with the electronic device 130 according to a second wireless technology specification or standard (e.g., a second type of wireless technology that uses a second frequency band and/or has a second channel bandwidth), and the user device 110 may communicate with the base station 140 according to a third wireless technology specification or standard (e.g., a third type of wireless technology that uses a third frequency band and/or has a third channel bandwidth). In one or more implementations, one or more of the first, second, or third frequency bands may be the same and/or may overlap, and one or more of the first, second, or third channel bandwidths may be the same.

The user device 110 may include collocated radio modules for enabling communication using the different wireless technology specifications or standards. For example, the user device 110 may include a cellular radio module that enables cellular communications, such as LTE communications, with the base station 140, a Bluetooth radio module that enables Bluetooth communications with the electronic device 130, and a WLAN radio module that enables WLAN communications with the access point 120. One or more of the radio modules, such as the WLAN radio module, may include multiple cores for providing multiple simultaneous streams, e.g. to facilitate MIMO communications. In one or more implementations, two or more of the modules may be combined into a single module, e.g. a Bluetooth modem and one or more WLAN cores may be combined (and collocated) on a Bluetooth/WLAN combination module.

Since the Bluetooth communications and the WLAN communications of the user device 110 (as well as Zigbee communications) may, in some instances, share the same frequency band, e.g. 2.4-2.4835 gigahertz (GHz), concurrent Bluetooth and WLAN communications via collocated radios may interfere with each other, which may result in packet loss. In particular, since the channel bandwidth of the WLAN communications may be 20 megahertz (MHz) or 40 MHz, while the channel bandwidth of the Bluetooth communications are only 1 MHz, the WLAN communications may cause significant wideband interference to the Bluetooth communications. Thus, if one or more of the WLAN cores is transmitting while a collocated Bluetooth modem is receiving, the WLAN transmission signals may be amplified by the automatic gain control of the Bluetooth receiver, thereby saturating the Bluetooth receiver chain and preventing the Bluetooth receiver from receiving a meaningful, e.g. decodable, signal.

However, when the Bluetooth modem can identify that one or more WLAN cores will be transmitting at a transmission level that will saturate the Bluetooth receiver chain while the Bluetooth receiver is scheduled to receive a Bluetooth transmission, the Bluetooth receiver may select a different gain table, such as a high-linearity gain table, for receiving the Bluetooth signal. The high-linearity gain table may start at a lower maximum gain setting than the standard gain table utilized by the Bluetooth receiver, thereby preventing the unwanted WLAN transmission signals from being amplified and saturating the Bluetooth receiver chain. Similarly, when the WLAN cores can identify that the Bluetooth modem will be transmitting at a transmission level that will interfere with the WLAN cores receiving a packet, the WLAN cores may select an alternate gain table, such as a high-linearity gain table, for receiving the packet.

Thus, in order to provide for simultaneous and/or overlapping WLAN transmission and Bluetooth reception via collocated radios, the user device 110 may implement coexistence signaling for adaptive gain table selection, as is discussed further below with respect to FIGS. 2-4.

Figure 2:
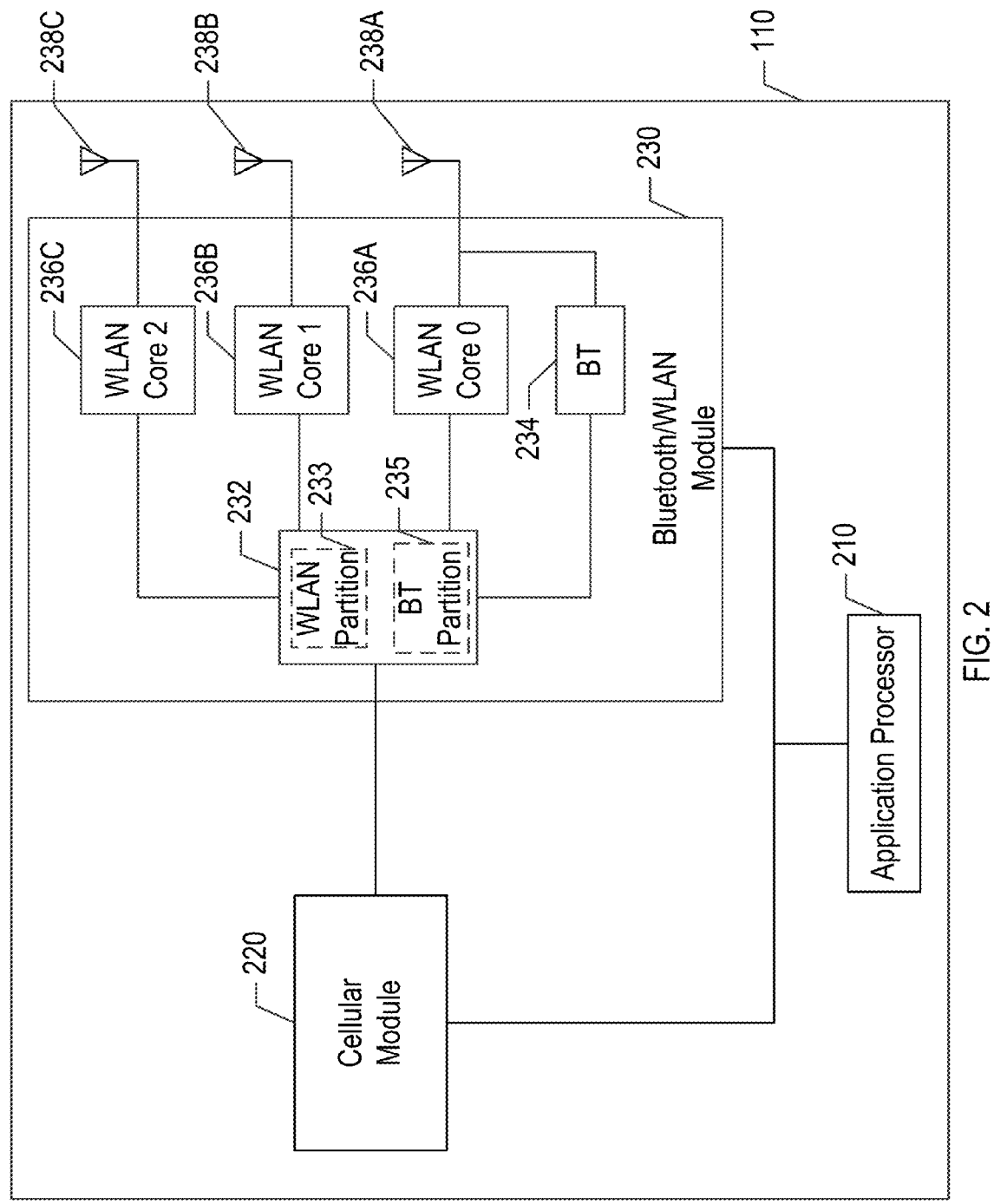
FIG. 2 illustrates an example user device implementing coexistence signaling for adaptive gain table selection in accordance with one or more implementations.

FIG. 2 illustrates an example user device 110 implementing coexistence signaling for adaptive gain table selection in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The user device 110 includes an application processor 210, a cellular module 220, and a Bluetooth/WLAN module 230. The application processor 210 may facilitate with coexistence between the cellular module 220 and the Bluetooth/WLAN module 230. The Bluetooth/WLAN module 230 includes a coexistence interface 232, a Bluetooth modem 234, and one or more WLAN cores 236A-C that are coupled to one or more antennas 238A-C. For explanatory purposes, the Bluetooth modem 234 is illustrated in FIG. 2 as sharing the antenna 238A with the WLAN core 236A; however, in one or more implementations, the Bluetooth modem 234 is coupled to a separate dedicated antenna (not shown) and therefore does not share the antenna 238A with the WLAN core 236A. The cellular module 220 may provide for cellular, e.g. LTE, communications and may include (or may be coupled to) a transceiver (transmitter/receiver) IC, a processor/controller, a memory, and one or more antennas.

The WLAN cores 236A-C may each include (or may be coupled to) a transceiver (transmitter/receiver) IC, processors/controllers, a memory, and one or more antennas 238A-C. For explanatory purposes, three WLAN cores 236A-C are illustrated in FIG. 2; however, any number of WLAN cores may be utilized, such as one, two, or four or more. Further for explanatory purposes, the WLAN cores 236A-C and the Bluetooth modem 234 are illustrated in FIG. 2 as being on a single Bluetooth/WLAN module 230; however, the WLAN cores 236A-C may be on a standalone WLAN chip and the Bluetooth modem 234 may be on a standalone Bluetooth chip with an interface coupling the two standalone chips for coexistence signaling and/or with interfaces coupling the two standalone chips to the coexistence interface 232.

The coexistence interface 232 may be an interface (e.g. a global coexistence interface), and/or a bus, that allows the WLAN cores 236A-C to communicate signals, such as coexistence signals, in real-time with the Bluetooth modem 234, and/or vice-versa. The coexistence interface 232 may also allow the cellular module 220 to communicate in real-time with one or more of the WLAN cores 236A-C and/or the Bluetooth modem 234. In general, the coexistence interface 232 allows multiple modems, cores, and/or modules of differing wireless technology standards and/or specifications to communicate with one another in real-time.

In one or more implementations, the coexistence interface 232 may include a partition 233 for communications from the WLAN cores 236A-C to the Bluetooth modem 234, and a separate partition for communications from the Bluetooth modem 234 to the WLAN cores 236A-C. The partition 233 may include registers that are written to by the WLAN cores 236A-C and read from by the Bluetooth modem 234, and the partition 235 may include registers that are written to by the Bluetooth modem 234 and read from by the WLAN cores 236A-C. The coexistence interface 232 may include additional partitions for communications between the cellular module 220 and the WLAN cores 236A-C and communications between the cellular module 220 and the Bluetooth modem 234, respectively.

The WLAN cores 236A-C may each provide the Bluetooth modem 234 with a real-time indication of an active WLAN transmission by transmitting a transmission indicator (e.g. a WLANTxOn bit) to the Bluetooth modem 234 via the coexistence interface 232. The WLAN cores 236A-C may also each provide an indication of the power level of any such transmission by transmitting a transmission power level indicator (e.g. a WLANTxPwr value) to the Bluetooth modem 234 via the coexistence interface 232. Thus, when the Bluetooth modem 234 determines that one or more of the WLAN cores 236A-C is transmitting, and/or that the power level of any such transmissions exceeds a power level threshold, when the Bluetooth modem 234 is scheduled to receive a Bluetooth packet, the Bluetooth modem 234 may select the high-linearity gain table for reception of the packet.

In one or more implementations, the Bluetooth modem 234 may also provide one or more of the WLAN cores 236A-C with a real-time indication of an active Bluetooth transmission by transmitting a transmission indicator (e.g. a BluetoothTxOn bit) to one or more of the WLAN cores 236A-C via the coexistence interface 232. The Bluetooth modem 234 may also provide an indication of the power level of any such transmission by transmitting a transmission power level indicator (e.g. a BluetoothTxPwr value) to one or more of the WLAN cores 236A-C via the coexistence interface 232. Thus, when one or more of the WLAN cores 236A-C, such as the WLAN core 236A, determines that the Bluetooth modem 234 is transmitting, and/or that the power level of any such transmissions exceeds a power level threshold, when the WLAN core 236A is scheduled to receive a WLAN packet, the WLAN core 236A may select an alternate gain table, such as a high-linearity gain table, for reception of the packet. One or more of the WLAN cores 236A-C may share a common power level threshold, or one or more of the WLAN cores 236A-C may each utilize a separate power level threshold. Since the front-end module/antenna isolation as well as internal IC isolation for the Bluetooth modem 234 may be different for each of the WLAN cores 236A-C, the Bluetooth modem 234 may store separate configurable power level thresholds, e.g. in on-chip registers, for each of the WLAN cores 236A-C. The Bluetooth modem 234 may also store, e.g. in on-chip registers, separate enable bits for each of the WLAN cores 236A-C. Thus, the Bluetooth modem 234 may individually enable/disable the adaptive gain table selection for the transmissions of each of the WLAN cores 236A-C via the on-chip registers. If the adaptive gain table selection is disabled for one or more of the WLAN cores 236A-C, such as the WLAN core 236A, the Bluetooth modem 234 ignores the coexistence signals transmitted by the WLAN core 236A when determining whether to use the standard or high-linearity gain table for reception of a packet.

The power level thresholds may be pre-configured for each of the WLAN cores 236A-C, such as based on empirically measured isolation between each of the WLAN cores 236A-C and the Bluetooth modem 234. However, if one of the WLAN cores 236A-C, such as the WLAN core 236A, transmits signals at a power level below the corresponding power level threshold that nonetheless saturate the receiver chain of the Bluetooth modem 234, the Bluetooth modem 234 may adaptively decrease the power level threshold for the WLAN core 236A. If signals transmitted by the WLAN core 236A continue to saturate the receiver chain of the Bluetooth modem 234, the Bluetooth modem 234 may continue to decrease the power level threshold for the WLAN core 236A until the receiver chain is no longer saturated by the signals transmitted by the WLAN core 236A.

The values of the standard gain table and the high-linearity gain table of the Bluetooth modem 234 may vary by implementation. However, in general the high-linearity gain table is constructed to handle very strong jammer levels. Thus, the initial gain indicated by the high-linearity table, e.g. the maximum gain, may be less than the initial gain indicated by the standard gain table in order to prevent high level jammers from saturating the receiver chain. For example, the initial gain setting of the standard gain table may utilize a component in the receiver chain, such as a low noise amplifier (LNA), to amplify the received signal, while the initial gain setting of the high-linearity table may configure the LNA in a bypass mode such that the received signal is not amplified by the LNA in the receiver chain.

For explanatory purposes, the coexistence interface 232 is discussed herein in the context of WLAN and Bluetooth transmissions. However, the coexistence interface 232 may be implemented in the context of any number of different communication technologies that utilize a shared medium.

In one or more implementations, one or more of the application processor 210, the cellular module 220, the Bluetooth/WLAN module 230, the coexistence interface 232, the partitions 233, 235, the WLAN cores 236A-C, and/or the Bluetooth modem 234, may be implemented in software (e.g., subroutines and code) and/or in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
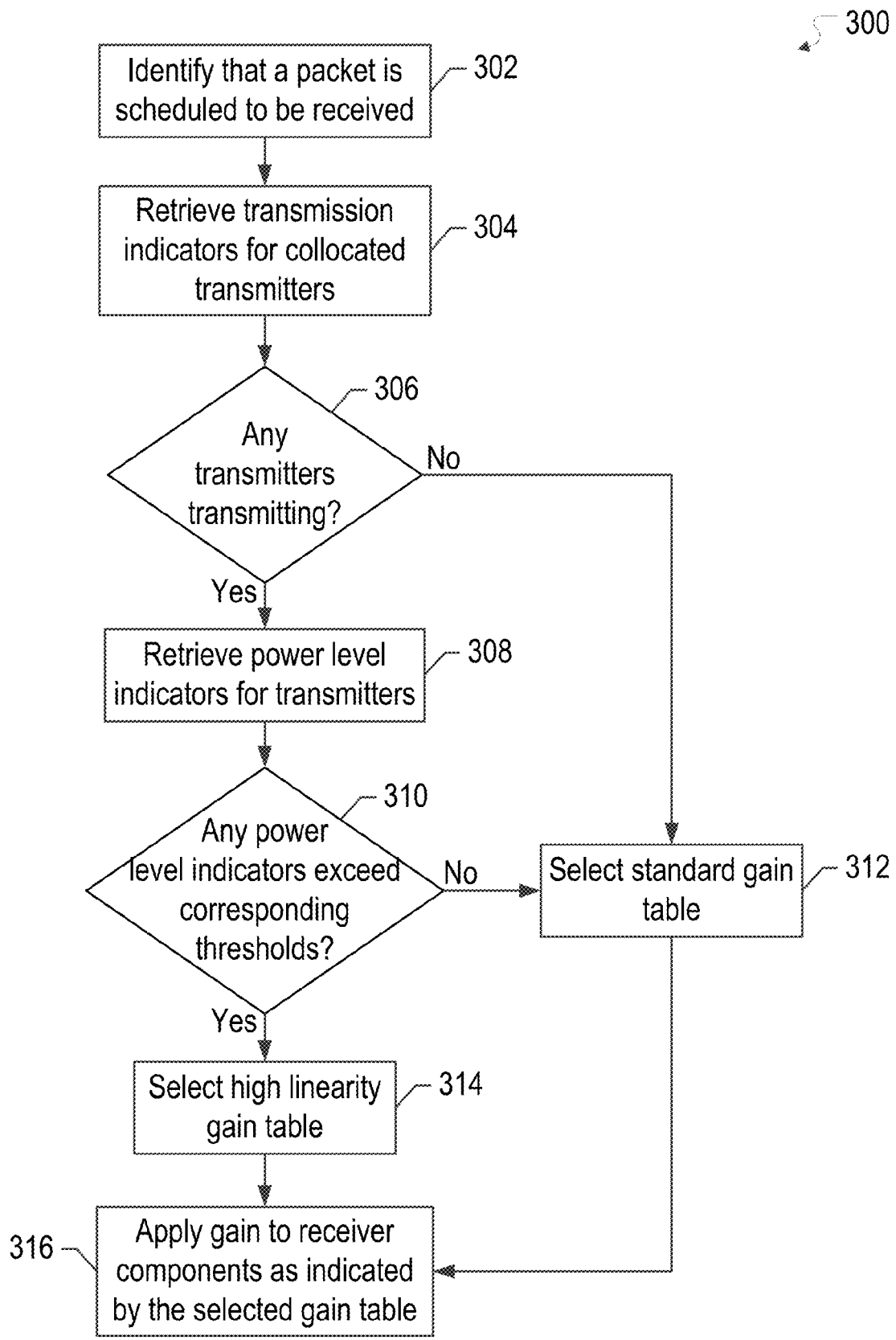
FIG. 3 illustrates a flow diagram of an example process of a user device implementing coexistence signaling for adaptive gain table selection in accordance with one or more implementations.

FIG. 3 illustrates a flow diagram of an example process 300 of a user device 110 implementing coexistence signaling for adaptive gain table selection in accordance with one or more implementations. For explanatory purposes, the example process 300 is primarily described herein with reference to the Bluetooth modem 234 of the user device 110 FIG. 2; however, the example process 300 is not limited to the Bluetooth modem 234 of the user device 110 of FIG. 2, e.g. the example process 300 may be performed by one or more of the WLAN cores 236A-C, and/or the example process 300 may be performed by one or more components of the Bluetooth modem 234 and/or the user device 110. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

The Bluetooth modem 234 identifies that a packet is scheduled to be received at a receiver of the Bluetooth modem 234 (302). For example, the Bluetooth modem 234 may receive an indication from the application processor 210 indicating that a Bluetooth packet is scheduled to be received in an immediately following or subsequent time period and/or clock cycle. The Bluetooth modem 234 retrieves transmission indicators for any collocated transmitters, such as the WLAN cores 236A-C, such as via the coexistence interface 232 (304). In one or more implementations, the Bluetooth modem 234 may first verify that the adaptive gain table selection is enabled for the collocated transmitters before retrieving the transmission indicators. The Bluetooth modem 234 may bypass the retrieving for any transmitters for which the adaptive gain table selection is not enabled. If the adaptive gain table selection is not enabled for any collocated transmitters, the Bluetooth modem 234 may select the standard gain table for receiving the packet (312) and apply gain to the receiver chain as indicated by the standard gain table (316).

If the retrieved transmission indicators indicate that none of the collocated transmitters are transmitting (306), the Bluetooth modem 234 selects the standard gain table for receiving the packet (312) and applies gain to the receiver chain as indicated by the standard gain table (316). If the retrieved transmission indicators indicate that one or more of the collocated transmitters are transmitting, the Bluetooth modem 234 retrieves the transmission power level indicators for the one or more transmitters that are transmitting, such as via the coexistence interface 232 (308). For explanatory purposes, the Bluetooth modem 234 is described as retrieving the transmission indicators for the transmitters (304) and the transmission power level indicators for the transmitters (308) separately. However, the Bluetooth modem 234 may retrieve the transmission indicators and the transmission power level indicators simultaneously. In one or more implementations, the transmission indicators and the transmission power level indicators may be passed, transmitted and/or pushed by the coexistence interface 232 to the Bluetooth modem 234.

The Bluetooth modem 234 determines whether any of the retrieved transmission power level indicators of the transmitters exceed the power level thresholds associated with the corresponding transmitters (310). For example, the Bluetooth modem 234 may store a separate power level threshold for each of the collocated transmitters. If none of the retrieved transmission power level indicators of the transmitters exceed the respective power level thresholds associated with the transmitters, the Bluetooth modem 234 selects the standard gain table for receiving the packet (312) and applies gain to the receiver chain as indicated by the standard gain table (316). If one or more of the retrieved transmission power level indicators of one or more of the transmitters exceeds one or more of the respective power level thresholds associated with the one or more transmitters (310), the Bluetooth modem 234 selects the high-linearity gain table for receiving the packet (314) and the Bluetooth modem applies gain to the receiver chain as indicated by the high-linearity gain table (316).

FIG. 4 illustrates example tables 410, 420, 430 listing bits utilized for coexistence signaling for adaptive gain table selection in accordance with one or more implementations. The enable detection table 410 lists the bits that may set by the Bluetooth modem 234 to enable the adaptive gain table selection for each of the WLAN cores 236A-C. Thus, if the wlTx2GCore0Det_Enable bits are set to enable for the WLAN cores 236A-B, and set to disable for the WLAN core 236C, the Bluetooth modem 234 will implement the adaptive gain table selection for transmissions by the WLAN cores 236A-B, but not for transmissions by the WLAN core 236C.

The power level threshold tables 420, 430 lists the bits that are used by the Bluetooth modem 234 to set the configurable power level threshold values for each of the WLAN cores 236A-C. Thus, the power level threshold values can be set differently for each of the WLAN cores 236A-C and/or may be individually adaptively configured, e.g. raised or lowered, by the Bluetooth modem 234 during operation of the Bluetooth modem 234.

Figure 5:
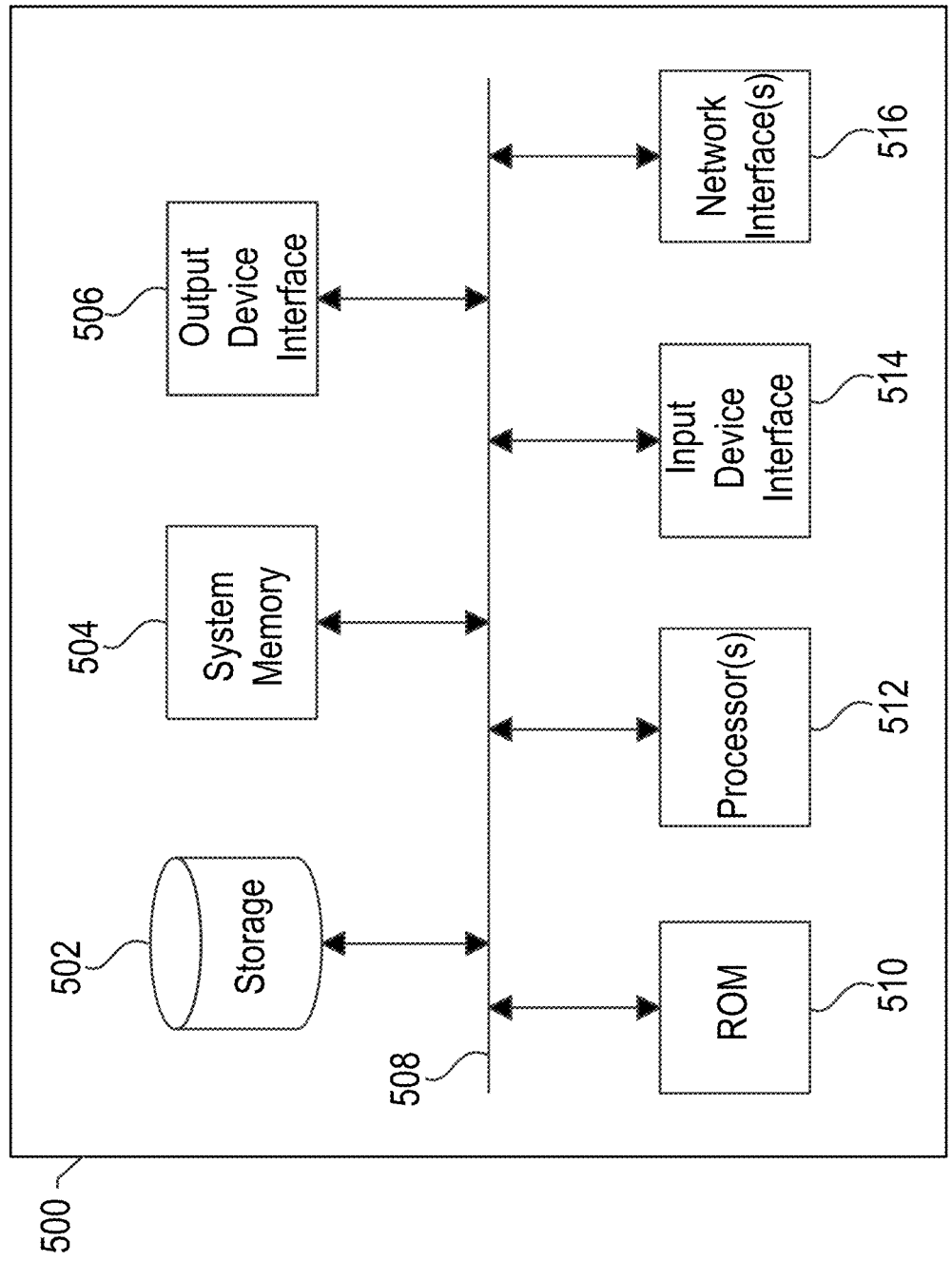
FIG. 5 conceptually illustrates an example electronic system with which one or more implementations of the subject technology can be implemented.

FIG. 5 conceptually illustrates an example electronic system 500 with which one or more implementations of the subject technology can be implemented. The electronic system 500, for example, may be, or may include, one or more of the user device 110, the access point 120, the electronic device 130, the base station 140, one or more wearable devices, a picocell, a microcell, a macrocell, a desktop computer, a laptop computer, a tablet device, a phone, and/or generally any electronic device. Such an electronic system 500 includes various types of computer readable media and interfaces for various other types of computer readable media. The electronic system 500 includes a bus 508, one or more processing unit(s) 512, a system memory 504, a read-only memory (ROM) 510, a permanent storage device 502, an input device interface 514, an output device interface 506, one or more network interface(s) 516, and/or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are utilized by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory (RAM). The system memory 504 may store one or more of the instructions and/or data that the one or more processing unit(s) 512 may utilize at runtime. In one or more implementations, the processes of the subject disclosure are stored in the system memory 504, the permanent storage device 502, and/or the ROM 510. From these various memory units, the one or more processing unit(s) 512 retrieve instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by the electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 5, bus 508 also couples electronic system 500 to one or more networks (not shown) through one or more network interface(s) 516. The one or more network interface(s) may include a cellular communication interface, a Bluetooth interface, a Bluetooth low energy (BLE) interface, a Zigbee interface, an Ethernet interface, a WLAN interface, a multimedia over coax alliance (MoCA) interface, a HomePlug interface, a reduced gigabit media independent interface (RGMII), or generally any interface for connecting to a network. In this manner, electronic system 500 can be a part of one or more networks of computers (such as a local area network (LAN), a personal area network (PAN), a peer-to-peer network (P2P), a wide area network (WAN), or an Intranet, or a network of networks, such as the Internet. Any or all components of electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, SSD, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "access point", "receiver", "computer", "server", "processor", and "memory" all refer to electronic or other technological devices. These terms exclude people or groups of people. For the purposes of the specification, the terms "display" or "displaying" means displaying on or by an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   at least one processor circuit configured to:
   identify that a packet is scheduled to be received by a receiver;
   retrieve at least one transmission indicator that indicates whether at least one transmitter is transmitting, wherein the at least one transmitter is collocated with the receiver within the device; and
   select a first gain table for reception of the packet by the receiver when the at least one transmission indicator indicates that the at least one transmitter is transmitting, otherwise selecting a second gain table for reception of the packet by the receiver, the first gain table having a lower maximum gain setting than the second gain table.

2. The device of claim 1, wherein the at least one processor circuit is further configured to:
   apply gain to at least one component of the receiver based at least in part on the selected first or second gain table; and
   receive the packet via the receiver while the at least one collocated transmitter is transmitting.

3. The device of claim 1, wherein the at least one processor circuit is further configured to:
   retrieve at least one transmission power level indicator that indicates at least one power level associated with the transmitting of the at least one transmitter; and
   select the first gain table for reception of the packet by the receiver when the at least one transmission indicator indicates that the at least one transmitter is transmitting and the at least one transmission power level indicator indicates that the at least one power level associated with the transmitting exceeds at least one power level threshold, otherwise selecting the second gain table for reception of the packet by the receiver.

4. The device of claim 3, wherein the first gain table is selected and the at least one processor circuit is further configured to:
   attempt to receive the packet utilizing the selected first or second gain table;
   determine that the packet is not receivable or decodable; and
   adjust the at least one power level threshold.

5. The device of claim 4, wherein the least one transmission indicator comprises a plurality of transmission indicators that each indicates whether one of a plurality of transmitters is transmitting.

6. The device of claim 5, wherein the at least one transmission power level indicator comprises a plurality of transmission power level indicators that each indicate one of a plurality of power levels associated with transmissions of one of the plurality of transmitters and the at least one power level threshold comprises a plurality of power level thresholds each corresponding to one of the plurality of transmitters.

7. The device of claim 1, wherein the first gain table comprises a high-linearity gain table, and the lower maximum gain setting of the first gain table comprises a lower initial maximum gain setting of the first gain table.

8. The device of claim 1, wherein the at least one processor circuit is further configured to:
retrieve the at least one transmission indicator via a coexistence interface.

9. The device of claim 1, wherein the at least one processor circuit is further configured to:
verify that at least one enable bit corresponding to the at least one transmitter is enabled prior to retrieving the at least one transmission indicator; and
when the at least one enable bit is not enabled, select the second gain table for reception of the packet by the receiver without retrieving the at least one transmission indicator.

10. The device of claim 1, wherein the receiver comprises a Bluetooth receiver and the at least one transmitter comprises at least one wireless local area network (WLAN) transmitter.

11. The device of claim 10, wherein the at least one transmitter further comprises at least one Zigbee transmitter.

12. A method performed by a device, the method comprising:
determining that a packet is to be received by a receiver during an immediately following time period;
retrieving a plurality of transmission power level indicators that indicate a plurality of transmission powers of a plurality of transmitters, wherein the plurality of transmitters are collocated with the receiver on a chip;
comparing each of the plurality of transmission powers to one of a plurality of transmission power level thresholds that is associated with one of the plurality of transmitters corresponding to each of the plurality of transmission powers;
selecting a first gain table for reception of the packet by the receiver when at least one of the transmission powers of at least one of the plurality of transmitters exceeds the compared at least one of the plurality of transmission power level thresholds, otherwise selecting a second gain table for reception of the packet by the receiver;
configuring gain for the receiver based at least in part on the selected first or second gain table, the first gain table having an initial lower maximum gain setting than the second gain table; and
receiving the packet via the receiver while at least one of the plurality of transmitters is transmitting.

13. The method of claim 12, wherein at least one of the plurality of transmission powers of at least one of the plurality of transmitters is zero.

14. The method of claim 12, wherein the receiver is associated with a first wireless communication technology and the plurality of transmitters are associated with a second wireless communication technology that differs from the first wireless communication technology.

15. The method of claim 12, wherein the first gain table is selected and the method further comprises:
attempting to receive the packet based at least in part on the first gain table;
determining that the packet is not receivable or decodable; and
decreasing the at least one of the plurality of transmission power level thresholds.

16. The method of claim 12, wherein a maximum gain of the first gain table is less than a maximum gain of the second gain table.

17. The method of claim 12, wherein retrieving the plurality of transmission power level indicators comprises retrieving the plurality of transmission power level indicators from a plurality of registers of a coexistence interface that is collocated with the receiver and the plurality of transmitters.

18. A computer program product comprising instructions stored in a non-transitory computer-readable storage medium, the instructions comprising:
instructions to determine whether a transmitter will be transmitting a first transmission while a receiver will be receiving a second transmission, the transmitter and the receiver being collocated within a chip;
instructions to select a first gain table for receiving the second transmission by the receiver when the transmitter will be transmitting the first transmission while the receiver will be receiving the second transmission, otherwise to select a second gain table for receiving the second transmission by the receiver, the first gain table having a lower maximum gain setting than the second gain table;
instructions to apply the selected first or second gain table to the receiver; and
instructions to receive the second transmission, by the receiver, while the transmitter is transmitting the first transmission.

19. The computer program product of claim 18, the instructions further comprising:
instructions to determine whether the transmitter will be transmitting the first transmission while the receiver will be receiving the second transmission by retrieving a value from a register of a coexistence interface, the value being written to the register by the transmitter.

20. The computer program product of claim 18, wherein the lower maximum gain setting of the first gain table comprises a lower initial maximum gain setting of the first gain table.

* * * * *